United States Patent [19]
Senour

[11] 3,868,848
[45] Mar. 4, 1975

[54] SOLID STATE DIGITAL STRAIN INDICATORS

[76] Inventor: Donald A. Senour, Blaisdell Dr., Carlisle, Mass. 01741

[22] Filed: Sept. 14, 1972

[21] Appl. No.: 289,072

[52] U.S. Cl. ............................ 73/88.5 R, 324/99 D
[51] Int. Cl. ............................................. G01b 7/16
[58] Field of Search ................ 73/88.5 R, 1 R, 1 B; 235/151.3; 340/347 NT; 324/99 R, 99 D

[56] References Cited
UNITED STATES PATENTS

| | | | |
|---|---|---|---|
| 3,193,762 | 7/1965 | Wu | 73/88.5 R X |
| 3,368,149 | 2/1968 | Wasserman | 324/99 R |
| 3,458,809 | 7/1969 | Dorey | 324/99 R |
| 3,566,397 | 2/1971 | Walton | 324/99 D |
| 3,797,305 | 3/1974 | Haskell | 73/1 R X |

Primary Examiner—Richard C. Queisser
Assistant Examiner—Stephen A. Kreitman
Attorney, Agent, or Firm—James E. Mrose

[57] ABSTRACT

A digital indicator responsive to strain-gage inputs incorporates gage-factor adjustment by way of a dual-slope integrator operable in two modes, one of which modes entails up-and-down integrations in relation to voltage references through different resistances, including a resistance which is adjustable to cause the indicator to produce a digital display of the existing gage factor, and the other of which modes entails up-and-down integrations in relation to output of a strain-gage amplifier and one of the voltage references, respectively, through opposite ones of the different resistances; portable operation of the indicator is under control of an R-C and relay timing and switching network which prevents wasteful battery usages.

9 Claims, 6 Drawing Figures

SOLID STATE DIGITAL STRAIN INDICATORS

BACKGROUND OF THE INVENTION

The present invention relates to improvements in digital indicating instruments such as those which amplify, measure and display the millivolt-per-volt output of wire and foil strain gages in microinch-per-inch terms, and, in one particular aspect, to unique digital strain-gage instrumentation wherein precision resistance adjustments related to gage factor are made with reference to digital displays by the same equipment and are switched into the associated dual-slope integration circuitry in sequencing which promotes accurate measurements automatically taking the gage factor into account.

Digital indicators based upon computer-type electronic circuitry and digital character displays have become highly practical devices which are both exceeding rapid in operation and are easily read. They serve admirably the purposes of resistance-type strain-gage measurements, for example, and, in that connection, it has been known to apply the output from one or more resistance-type strain gages or simple strain-gage transducer to a preamplifier which conditions that output for presentation, as a signal voltage, to an analog-to-digital converter in which a train of pulses is then periodically developed as an exact function of the existing signal voltage; the pulse trains thus produced are gated into a counter and latch circuit, whence the resulting coded digital data is responsible for excitations of appropriate digital display tubes. However, an inherent difficulty associated with use of various types of indicators originates with the strain gages themselves, and, specifically, with the fact that, as manufactured, they normally and unavoidably exhibit different so-called "gage factor", which is a dimensionless relationship of change in resistance to change in length or strain. Gage factor thus represents the sensitivity or resistance change of a particular gage as it witnesses a predetermined strain. Electrical resistance strain gages are commonly marked with their gage factors, so that they may be taken into account by the user when performing strain measurements, and, typically, constantan gages may have gage factors ranging from about 1.8 to 2.2 micro-ohms/ohm, with certain others ranging from about 1.5 to 4.0 micro-ohms/ohm. When allowance for gage factors has been properly made, instrumentation which responds to load-induced resistance changes of gage resistances may then more accurately provide output readings directly in desired units, such as microinches/inch.

Even though the associated instrumentation may itself be highly accurate, imperfect adjustment to compensate for the different gage factors of the different gages used with it will inevitably result in reading errors. When it is sought to make that adjustment in a known manner by way of a compensating variable resistance, it becomes exceedingly difficult to set and hold the resistance adjustment accurately, such that the measurement not only may be imperfect but its actual precision is in any event rendered uncertain. Among the underlying recognitions associated with the present invention is that which resolves these adjustment problems by causing the selfsame instrument which displays the measurements to serve, at will of the operator, as indicator of and guide for the actual gage factor adjustment, also. The preferred digital instrumentation under discussion is of a type which involves a conventional form of dualslope integrator network, as to which collateral reference may be had to descriptions contained in U.S. Pat. No. 3,368,149, for example; however, the inherent operational characteristics of such a network are peculiarly suited to the translations of measurement-input voltages into distinctive counts of pulses and do not hold suggestion either for processing of gage-factor adjustments into displays or for conversion of any such adjustments, once effected somehow, into substantially-errorless related corrections of input measurements by the integrator network.

The nature of field applications for strain-gage instrumentation like that under discussion is such that portability and self-sustained operation are commonly required to meet the needs of measurements at remote sites where reliable laboratory-quality power sources are unavailable. Although prime-or alternate-source battery packs are of course well-known expedients for satisfying these needs, it is too often found that such costly and critical sources are improvidently exploited and do not sustain the long useful life of which they are theoretically capable. Wholly manual switching cannot satisfactorily be relied upon, either because of inevitable inattention by the operator or because of interference with other essential activities by the operator.

SUMMARY OF THE INVENTION

The present invention is aimed at creating improved digital-indicating strain-gage measurment systems in which gage-factor adjustments and compensations can be achieved conveniently and precisely, and at realizing improved performance of measurement equipment operated from battery-powered supplies. In a preferred embodiment, the usual dual-slope integrator network, which customarily functions to convert the strain-related voltages from a resistance-type strain-gage sensing circuit into pulse trains of distinctive counts for translation into digital displays, is arranged to be switched manually to a gage-factor adjustment mode of operation wherein a precision variable-resistance unit, fed via a reference voltage source, serves to control the integrator network operation and promote a resulting digital display of the numerical value of the gage factor which will be correctly compensated by the system when it is excited by strain-related voltages developed by a strain-gage primary detector having that gage factor. Knowing that gage factor value, from the manufacturer-supplied data supplied with the gage or gages, the operator may adjust the precision variable-resistance unit until the instrument digital display is of the prescribed value. Subsequently, the same integrator network is manually switched to a measurement mode of operation in which the thus-adjusted gage-factor resistance unit modifies the network's operational characteristics such that the digital display of strain-related measurements will be accurately made in terms of the desired units under the existing gage factor conditions. For these purposes, the resistances which respectively regulate up-and down-integration periods of the dual-slope integrator network are not in permanent positions or of permanent value, but, instead, are further electronically switched as to network position and involve adjustment for gage factor in one case. A preferred practice involves a push-button switching whereby a system reference voltage is connected to be integrated upwardly through a fixed pre-selected resistance during each up-integration period of the dual-slope integrator and then the precision variable-resistance unit is connected to control the alternate down-integrations in relation to another opposite-polarity system reference voltage. In this gage-factor adjustment mode of operation, the resulting digital display by the instrument is of numerical values which may be taken to represent some gage factor of gage sensor input to be connected to the system, and the precision resistance unit is adjusted until the numerical display corresponds to the desired gage factor value. Once that adjustment is achieved, the push-button controlled switching is reversed, and the amplified output from the strain-gage sensor input is connected to be integrated upwardly by the dual-slope integrator, but through the preadjusted precision resistance unit, and then the alternate down-integrations are performed by way of the fixed resistance in relation to an appropriate-polarity one of the system reference voltages. In the latter mode of operation, the measurement displays automatically become self-corrected for the existing gage-factor conditions.

Battery operation, for both modes of functioning, is under control of a further push-button switch which, when momentarily depressed, occasions charging of a capacitor and conduction of a transistor in circuit with a system-energizing relay. Depending upon the setting of an associated variable resistance through which the capacitor discharges, the transistor holds the system in a fully-energized state, via a battery pack, for only a desired brief interval sufficient to permit display readings.

Accordingly, it is one of the objects of the present invention to provide a novel and improved system for precision measurements uniquely self-compensated for different sensitivities of input transducers.

Another object is to provide novel and advantageous digital strain-indication equipment in which gage-factor adjustments may be effected with reference to digital displays by the same equipment.

A further object is to provide improved gage-factor-corrected digital strain indicators wherein up- and down-integrations of a dual-slope indicator are under control of different resistances, one of which is adjustable to effect gage-factor setting, and which are reversed in function during gage-factor-setting and measurement modes of operation to provide automatic compensation for different input gage-factors.

Still further, it is an object to optimize useful battery life for the powering of indicating instruments by way of uncomplicated low-cost RC timing controls.

BRIEF DESCRIPTION OF THE DRAWINGS

Although those aspects of this invention which are considered to be novel are expressed in the appended claims, further details as to preferred practices and as to further objects and features thereof may be most readily comprehended through reference to the following detailed description when taken in connection with the accompanying drawings, wherein:

DETAILED DESCRIPTION OF THE PREFERRED EMBODIMENTS

Figure 1:
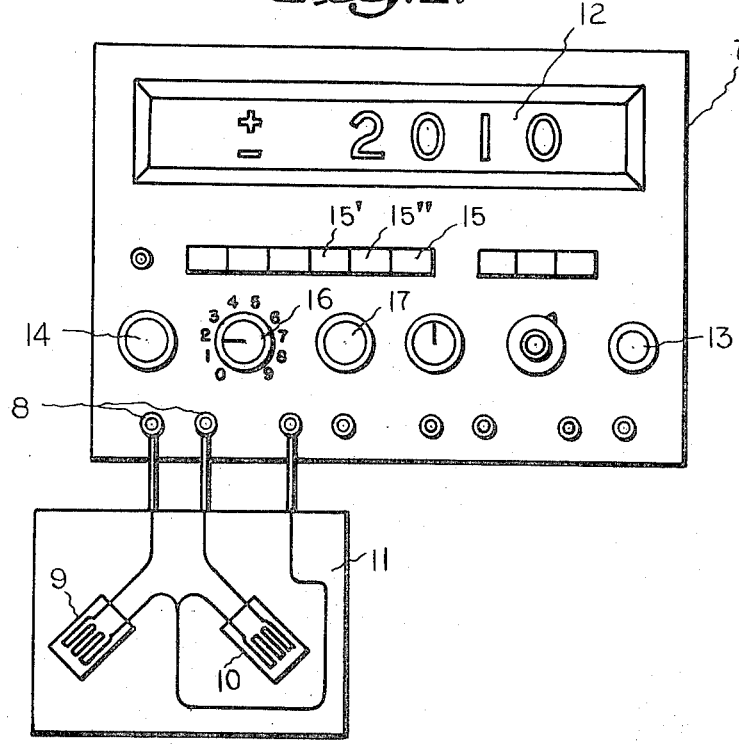
FIG. 1 provides a pictorial view of an improved gage-factor-correcting digital strain indicator shown connected with a half-bridge gage configuration for strain measurements.

Having reference to the drawings, wherein like reference characters designate identical or corresponding components and units throughout the several views, and more particularly to FIG. 1 thereof, one embodiment of an improved portable digital strain indicator system incorporating gage-factor adjustment and compensation provisions is shown to include a self-contained indicator assembly 7 with input terminals 8 for connection with various strain-gage sensors. As illustrated, two resistance-type strain gages 9 and 10, in a half-bridge configuration, are associated with the surface of a specimen 11 undergoing loading, although, in other instances, the indicator may receive inputs from a single gage (quarter bridge), from a full bridge configuration of gages, or from certain load or pressure transducers. Digital display readouts of measurement data, and of gage-factor settings, during different modes of operation, are presented substantially instantaneously on the readout display panel 12 by way of miniature glow-discharge tubes, together with appropriate polarity indications. For purposes discussed in greater detail hereinafter, a manually-operated "read" switch element 13 may be actuated by the operator to cause the indicator to be energized only for a brief interval regulated by setting of a display-time potentiometer knob 14. For purposes of gage-factor adjustment, there is provided a push-button switch 15 and both "coarse" and "fine" adjustment knobs 16 and 17 associated with a multi-tap resistance and variable resistance, respectively. Further push-buttons 15' and 15" serve to actuate electrical switching which connects the indicator to function in a normal mode for display of measured load by the input sensor gaging, in different ranges.

Figure 2:
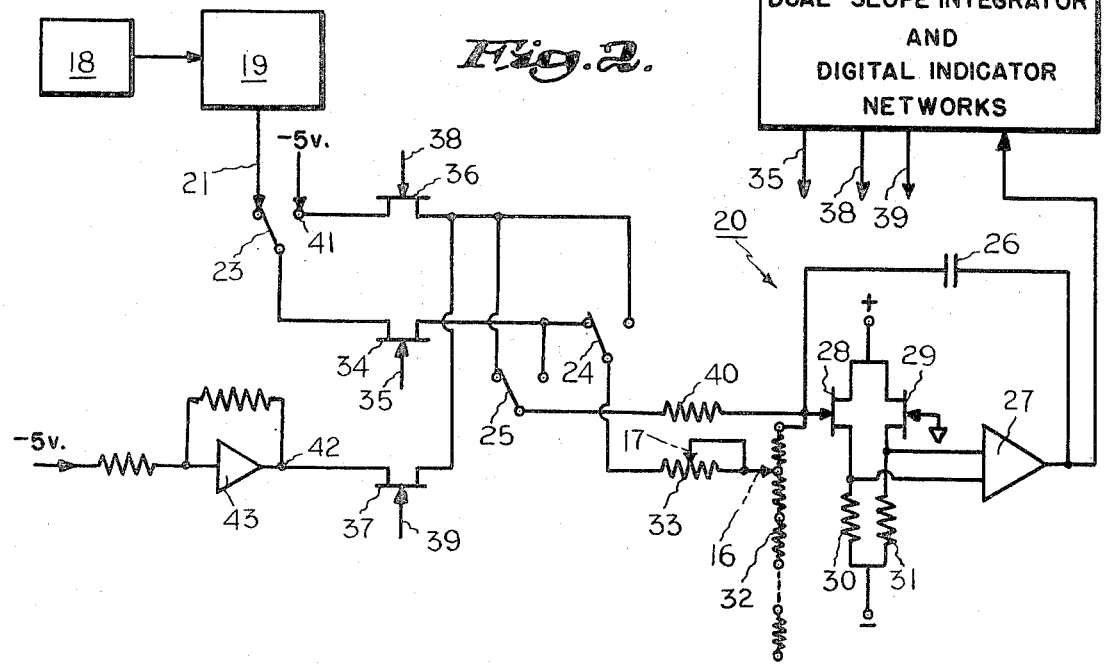
FIG. 2 is a partly schematic and partly block-diagrammed representation of an improved gage-factor-correcting system according to the present invention.

In FIG. 2, the diagrammatic representations are of a strain-gage input sensor, 18, feeding a pre-amplifier 19 which, in turn, is intended to deliver amplified measurement-related voltages to certain dual-slope integrator circuitry 20 via lead 21, the balance of the usual dual-slope integrator and digital indicator networks being designated by block 22. When switch armatures 23, 24 and 25 are manually set to the positions shown in FIG. 2, the dual-slope circuitry 20, including the conventional charging capacitor 26, integrated-circuit amplifier section 27, and associated network of transistors and resistors 28–31, is at certain times fed by the amplified measurement-related input voltages through the series combination of both the coarse-tuning tapped gage-factor adjusting resistance 32 and the fine-tuning continuously variable resistance 33. At those certain times, which correspond to the alternate upintegration periods of operation of the dual-slope integrator circuitry 20, the switching transistor 34 is pulsed to an "on" or conducting state by way of the customary source of control pulses from networks 22, via lead 35. During those same upintegration periods, the switching transistors 36 and 37 are maintainedd in an "off" or non-conducting state, although, during the alternate down-integration periods, an appropriate one of these is turned "on" by way of the customary source of pulses for that purpose, from network 22, via leads 38 and 39, and instead connects a pre-selected fixed resistance 40 to control the discharge of up-integrated voltage in relation to the appropriate one of either a negative reference voltage source 41 or a positive voltage source 42, the latter being simply an inversion of the polarity of the same negative source by inverting amplifier 43. These controlled high-speed electronic switching practices and electronic hardware implementations of them are of course well known in prior dual-slope integrator and associated digital indicator systems, and are not, per se, unique with the present invention.

By way of background explanation, primarily, it is noted that conventional digital indicator (such as voltmeter) systems of the type under discussion employ a dual-slope integrator to determine, in alternate periods, bursts of output pulses in which the numbers of pulses in each burst are directly related to the input voltage, such as the voltage from input strain-gage pre-amplifier 21. These output pulses are delivered to a binary-coded-decimal counter, with each counted burst of such pulses being stored in a conventional integrated-circuit latch storage unit, the output of the latter exciting a conventional decoder driver driving the stages of a visual readout device. The decimal digital equivalent of the information appearing in the counter is thus reproduced on the readout device, which may comprise an appropriate number of digital display tubes, such as Nixie tubes in seven-segment arrays or the like illuminating panel 12. An objective of the dual-slope integrator network is to produce the aforesaid burst of pulses, and, in that connection, an oscillator is used to produce certain pulses which, at a given repetition rate, will initiate successive "readings" or development of the said bursts and will reset or clear the counter. On command of each such oscillator-induced pulse, the dual-slope integrator commences integration of the voltage input to it through the resistance which is present, and, simultaneously, a logic-controlled clock commences a timing operation in which it delivers pulses at a precise rate to the counter. Once a predetermined pulse count has been reached in the counter, on the occurrence of the 10,000$^{th}$ pulse, for example, a resulting pulse causes logic circuitry to reset the counter to a cleared condition and to initiate a discharge of the previously-integrated signal in the dual-slope integrator back down to a predetermined reference level, such as that of source 41, through the resistance present in the discharge circuit at that time. The clock feeds its pulse output to the counter during this second or "down-integration" discharge step until logic circuitry commands it to stop, which occurs when the aforesaid reference level is reached. Slope of the decreasing voltage is constant during each such second step, and the time to reach the reference level is thus normally accurately related to the previously-integrated input voltage because the time of its integration was closely governed by the clock. However, in the improved system involving practice of the present invention, the up-integration times, though fixed, result in modifications of the integrated voltages during such times, because the integration is effected through the resistances 32 and 33 which reflect different adjustments for different gage factors of the different strain-gage inputs which may be served by the instrument; in turn, the down-integration, though effected through a fixed resistance, 40, will necessarily reflect these adjustments also and cause the digital readout to be modified to compensate for the different strain-gage sensitivities. In the intervals remaining between the ends of the down-integration steps and the commencements of the next up-integration steps, the counts developed in the binary coded decimal counter are stored and decoded to decimal representations thereof in a conventional decoder driver serving the stages of the visual readout which visually displays the decimal equivalent of the binary coded information appearing in the counter. The repetition rate for the cyclic system readings is high enough for the readout to track expected changes in input signals, such as three readings per second. It will be understood, therefore, that the networks 22 and associated circuitry appearing in FIG. 2 incorporate the known digital indicator expedients which have just been referred to.

Figure 3:
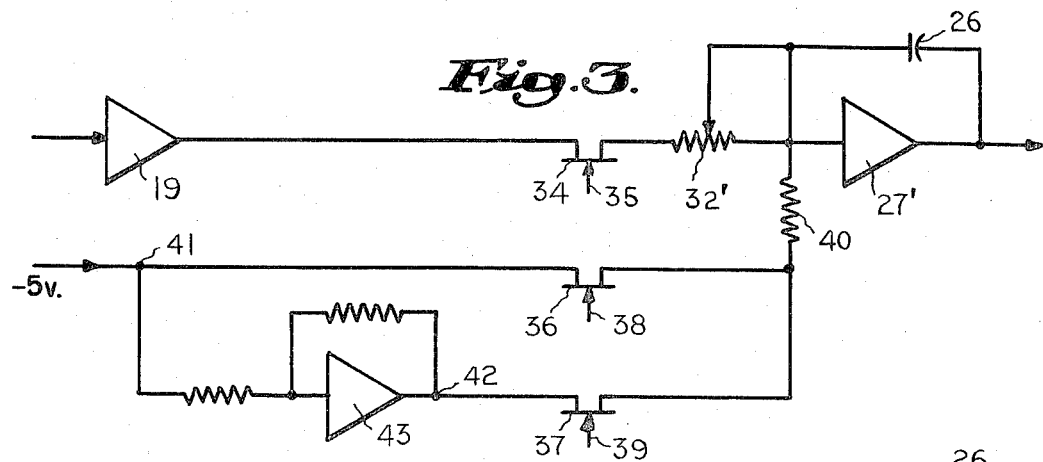
FIG. 3 illustrates in block-and schematic-form the switched connections for gage-factor-adjustment mode of operation of part of the system of FIG. 2.
Figure 4:
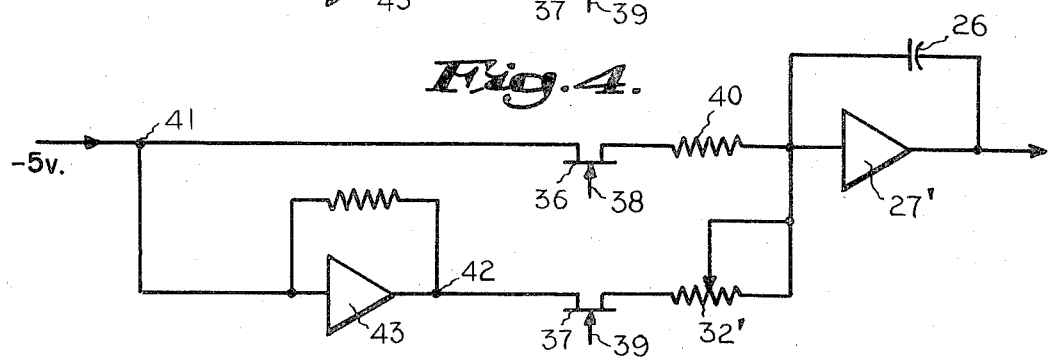
FIG. 4 illustrates in block-and schematic-form the switched connections for measurement mode of operation of the same part of the system of FIG. 2.

The circuit arrangements portrayed in FIGS. 3 and 4 characterize in simplified form the system connection conditions which exist in the FIG. 2 instrument while it is switched to measurement and gage-factor-adjustment modes of operation, respectively. In FIGS. 3 and 4, the coarse-and fine-adjustment resistances associated with the adjusted gage factor are conveniently represented by a single variable resistance, 32', and dual-slope integrator circuitry is likewise consolidated schematically under reference character 27'. As has already been explained, the measurement mode of operation (FIGS. 2 and 3) entails up-integration of the amplified strain-gage input through an adjusted resistance, 32', and down-integration through a fixed resistance, 40. However, FIG. 4 shows that, in a gage-factor-adjustment mode of operation, the up-integration is, instead, of a voltage from reference potential at 41 through the fixed resistance 40, and the down-integration is with reference to the inverted polarity of the same potential, appearing at 42, and with a discharge through the adjusted resistance unit 32'. For the latter purposes, depression of pushbutton switch 15 causes reversals of the positions of switch armatures 23–25 in FIG. 2, and fixed resistance 40 is thereby placed in circuit with the dual-slope integrator 20 and reference source potential at 41 during up-integration periods as controlled by switching transistor 34. During the alternate down-integration periods, the series-connected variable and tapped resistances 32 and 33 constituting resistance unit 32' are in the discharge path between the dual-slope integrator capacitance 26 and the inverted-polarity reference source potential at 42 as controlled by switching transistor 37. While the gage-factor-adjustment mode of operation is effective, the operator adjusts "coarse" tapped resistance 32 by way of knob 16 to realize a close approximation of the desired gage factor numerical value on the display panel 12, and then "fine-tunes" that display to read the precise gage factor value by adjusting control knob 17 and the associated variable resistance 33.

Up-integration time of the dual-slope integrator is always the same, for both modes of operation, because this is clock-controlled for a predetermined number of counts, such as the 10,000 noted earlier herein. If resistances 32' and 40 were made the same in the course of a gage factor adjustment of 32', then the down-integration time would be the same as the up-integration time, or would extend for 10,000 clock-controlled counts, also, this being the condition for a gage factor setting and reading of 10,000. When adjusted resistance 32' is less than resistance 40, the gage factor reading will be less than that, of course. Inasmuch as the up-integration time and input voltage and resistance 40 are all fixed in the gage-factor-adjustment mode of operation, it is only the slope of voltage vs. time which changes, during down-integration times, with different adjustments of resistance 32'. The situation is different during the normal or measurement mode of operation, because the measured input voltage and resistance 32' may be different during the up-integration times, only the time being constant; however, fixed resistance 40 is always in circuit during the down-integration times, and this means that the slope of voltage vs. time during such down-integration times is constant. Accordingly, if 32' were to be set for a gage factor of 10 in the aforementioned extreme case, and were to be set for a gage factor of 2 in another case, this would signify that the gage in the first case is five times as sensitive as the other, and, for measurement of the same strain, the first gage would be expected to yield five times the voltage output from the associated preamplifier 19; however, in the measurement modes of operations, the resistance 32' would in the first case be five times as large as that in the second case and the different voltage outputs would both be up-integrated to the same level in the dual-slope integrator. In turn, the respective down integrations, through the fixed resistance 40, would be the same and would result in the same number of clock-controlled counts and the same digital measurement display. Output of the dual-slope integrator is thus directly proportional to gage factor of the strain gage and inversely proportional to resistance unit 32', in the measurement mode of operation. In similar fashion, other values of gage factor, when properly set by way of resistance unit 32', result in sensitivity-or gage-factor-corrected measurements. Importantly, the resistance unit 32' is adjusted via the same display instrument in which it serves to effect measurement corrections, and possible adjustment and measurement errors are thereby minimized; further, there is a self-evident convenience in performing the gage-factor adjustments in this way. Preferably, the same system reference supply voltage appearing at 41 is used to excite the strain gage sensing arrangement which provides the system input, and, has been said earlier herein, that same voltage is also inverted by amplifier 43 to provide the opposite-polarity reference when needed; accordingly, the system measurements are rendered substantially independent of minor variations in supply voltage.

Figure 5:
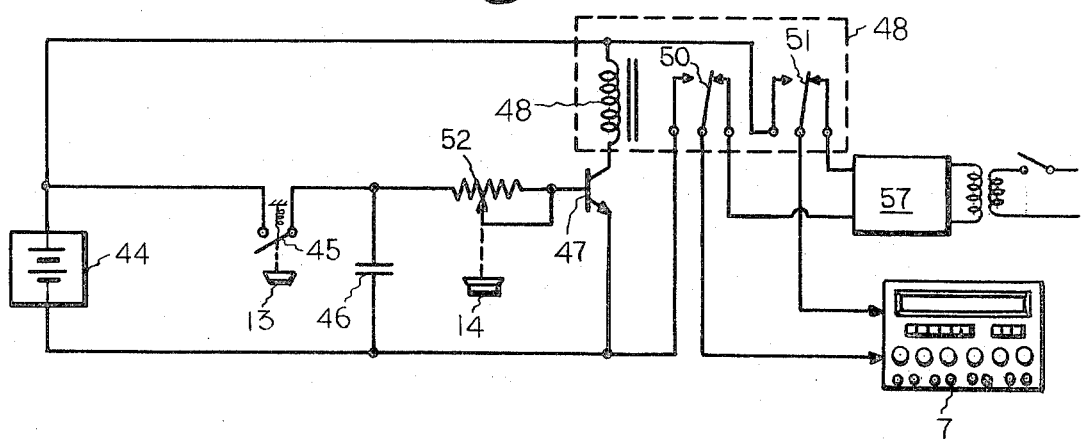
FIG. 5 is a partly pictorial and schematic portrayal of a battery-saver network in association with the indicator of FIG. 1.
Figure 6:
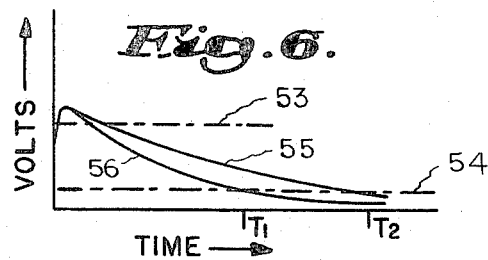
FIG. 6 represents graphically the voltage and time relationships in the network of FIG. 5.

Despite the aforesaid independence from certain variations in the supply, it is obviously important to guard against wasteful uses of batteries which are employed to power the system, particularly in the case of portable units so powered. Commonly, the operator's attention is diverted and the system batteries may too quickly become exhausted when the equipment has inadvertently been needlessly left in operation. The FIG. 5 provisions are a safeguard against such mishap, and include both the aforementioned actuating knob 13 and the timing-adjustment knob 14 for purpose of insuring that the instrument 7 will only be energized by the battery supply 44 for a brief predetermined interval (such as 5–20 seconds, or longer) ample to signal readings to the operator. In that connection, knob 13 momentarily actuates a switch 45 through which a main capacitor 46 is immediately charged by the battery and through which the control-element (base) of a transistor 47 is biased to an "on" or conducting state. Thereupon, the coil 48 of a multi-pole relay 49 becomes energized by way of the battery and series-connected conducting path of the transistor, causing switch armatures 50 and 51 to connect the battery pack 44 in powering relation to instrument 7. Depending upon the setting of variable resistance 52 by time-setting knob 14, the times for capacitor 46 to discharge to a predetermined low level through it and transistor 47 may be varied as desired, that predetermined level being the level at which the main conduction path of the transistor ceases to conduct and results in de-energizing of the relay coil 48 and disconnection of the battery supply to instrument 7 by way of the relay armatures. In the FIG. 6 illustration of voltage-time relationships associated with capacitor 46, voltage level 53 is that at which transistor 47 conducts and energizes relay 48, and 54 corresponds to the aforementioned predetermined low level. A high value of resistance 52 prolongs the capacitor discharge after the fashion of curve 55, resulting in system de-energizing at a time $T_2$ which is longer than some other cut-off time, $T_1$, which would be involved with a lower value of resistance 52 and a more rapid discharge characterized by curve 56. Relay 48 may be replaced by a wholly electronic network of like character in an alternative embodiment. A companion AC source 57 is represented for system operation where that type of supply is expected to be available also, although no self-terminating operation is then critical.

In connection with this specification, it should be understood that the specific embodiments and practices herein described have been presented by way of disclosure rather than limitation, and that various modifications, combinations and substitutions may be effected by those skilled in the art without departure in spirit or scope from this invention in its broader aspects and as set forth in the appended claims.

What I claim as new and desire to secure by Letters Patent of the United States is:

1. Electrical indicating apparatus accommodating signal inputs from input transducers having different sensitivities, comprising a dual-slope integrator wherein input signals are periodically up-integrated for a predetermined time and then down-integrated until the integrator output is restored to a predetermined signal level, a sensitivity-adjustment variable resistance and a fixed resistance, means providing visual displays responsive to down-integration times of said integrator, first means for applying a first reference signal as input to said integrator through said fixed resistance during up-integration times thereof and a second signal to said integrator through said variable resistance as a reference during alternate down-integration times thereof, and second means for applying signals from a transducer as input to said integrator through said variable resistance during up-integration times thereof and one of said first and second signals to said integrator through said fixed resistance as a reference during alternate down-integration times therof, whereby adjustment of said variable resistance to cause said visual display means to display the known value of sensitivity of the transducer during operation of said first means results in display of measurements compensated to account for sensitivity of the transducer during operation of said second means.

2. Electrical indicating apparatus as set forth in claim 1 wherein said first and second means comprise means for electrically switching said integrator selectively either into a circuit relationship wherein said first reference signal is applied as input through said fixed resistance during said up-integration times and a second signal is applied as a reference through said variable resistance during said down-integration times, or wherein said transducer signals are applied as input through said variable resistance during said up-integration times and one of said first and second signals is applied as a reference through said fixed resistance during said down-integration times.

3. Electrical digital indicating apparatus accommodating signal inputs from strain-gage sensors having different gage factors, comprising a dual-slope integrator wherein input voltages are periodically up-integrated for a predetermined time and then down-integrated until the integrator output is restored to a predetermined voltage level, a variable gage-factor-adjustment resistance and a fixed resistance, digital indicator means providing visual digital displays responsive to down-integration times of said integrator, gage-factor-adjustment means for applying a first reference voltage as input to said integrator through said fixed resistance during up-integration times thereof and an opposite-polarity reference voltage to said integrator through said variable resistance as a reference during alternate down-integration times thereof, and measurement means for applying voltages responsive to signal inputs from a strain-gage sensor as input to said integrator through said variable resistance during up-integration times thereof and an opposite-polarity one of said reference voltages to said integrator through said fixed resistance as a reference during alternate down-integration times thereof, whereby adjustment of said variable resistance to cause said digital indicator means to display digitally the known numerical value of the gage factor of the strain-gage sensor during operation of said gage-factor-adjustment means results in digital display of measurements responsive to signal inputs from the strain-gage sensor which are compensated for gage factor during operation of said measurement means.

4. Electrical digital indicating apparatus as set forth in claim 3 wherein said gage-factor-adjustment means and said measurement means comprise means for electrically switching said integrator selectively either into a gage-factor-adjustment relationship wherein said first reference voltage is applied as input through said fixed resistance during said up-integration times and an opposite-polarity reference voltage is applied as a reference through said variable resistance during down-integration times, or into a measurement relationship wherein voltages responsive to said sensor are applied as input through said variable resistance during said up-integration times and an opposite-polarity one of said reference voltages is applied as a reference through said fixed resistance during said down-integration times.

5. Electrical digital indicating apparatus as set forth in claim 4 wherein said switching means includes manually-acutated electrical switches, and wherein said variable gage-factor-adjustment resistance includes a manually-adjustable multi-position tapped resistance, for setting gage factor coarsely, in series with a manually-adjustable continuously-variable resistance for fine tuning of the gage factor.

6. Electrical digital indicating apparatus as set forth in claim 5 further including a tap-position indicator associated with said tapped resistance and calibrated to indicate coarse gage factor.

7. Electrical digital indicating apparatus as set forth in claim 4 further including means for applying electrical signals related to said first reference voltage as excitation for the strain-gage sensor, and inverting amplifier means producing said opposite-polarity reference voltage responsive to said first reference voltage.

8. The method of effecting sensitivity adjustment of electrical indicating apparatus intended to accommodate signal inputs from input transducers having different sensitivities and including a dual-slope integrator wherein input voltages are periodically up-integrated for a predetermined time and then down-integrated until the integrator output is restored to a predetermined voltage level and further including digital indicator means providing digital displays responsive to down-integration times of said indicator, which comprises first applying a first reference voltage as input to the integrator through a fixed resistance during up-integration times thereof and an opposite-polarity reference voltage to the integrator through a variable resistance as a reference during alternate down-integration times thereof, adjusting said variable resistance until the digital display by the digital indicator means corresponds to the sensitivity of a particular input transducer, and then applying voltages from the transducer as input to the integrator through the adjusted variable resistance during up-integration times thereof and an opposite-polarity one of the reference voltages to the integrator through the fixed resistance as a reference during alternate down-integration times thereof.

9. The method as set forth in claim 8 wherein the transducer comprises a strain-gage sensor and wherein said variable resistance is adjusted until the digital display by the digital indicator means corresponds to the numerical value of the gage factor for the strain-gage sensor.

* * * * *